United States Patent [19]
Colton

[11] Patent Number: 5,986,574
[45] Date of Patent: Nov. 16, 1999

[54] SYSTEM AND METHOD FOR COMMUNICATION BETWEEN REMOTE LOCATIONS

[75] Inventor: Laurence J. Colton, Layfayette Hill, Pa.

[73] Assignee: PECO Energy Company, Philadelphia, Pa.

[21] Appl. No.: 08/949,440

[22] Filed: Oct. 16, 1997

[51] Int. Cl.$^6$ .................................................. G08B 23/00
[52] U.S. Cl. ............................... 340/870.02; 340/310.01; 340/870.06; 340/870.07; 379/106.03
[58] Field of Search ...................... 340/870.02, 870.03, 340/870.07, 870.11, 310.01, 310.06; 379/106.01, 106.05

[56] References Cited

U.S. PATENT DOCUMENTS

| | | |
|---|---|---|
| 3,445,814 | 5/1969 | Spalti . |
| 3,656,112 | 4/1972 | Paull . |
| 3,683,343 | 8/1972 | Feldman et al. . |
| 3,688,271 | 8/1972 | Rouse . |
| 3,693,155 | 9/1972 | Crafton et al. . |
| 3,702,460 | 11/1972 | Blose . |
| 3,705,385 | 12/1972 | Batz . |
| 3,706,930 | 12/1972 | Harner . |
| 3,719,928 | 3/1973 | Oishi et al. . |
| 3,747,104 | 7/1973 | Pansini . |
| 3,815,119 | 6/1974 | Finlay, Jr. et al. . |
| 3,820,106 | 6/1974 | Yamashita et al. . |
| 3,855,503 | 12/1974 | Ristuccia . |
| 3,900,842 | 8/1975 | Calabro et al. . |
| 3,911,415 | 10/1975 | Whyte . |
| 3,914,757 | 10/1975 | Finlay, Jr. et al. . |
| 3,925,763 | 12/1975 | Wadhwani et al. . |
| 3,942,168 | 3/1976 | Whyte . |
| 3,942,170 | 3/1976 | Whyte . |
| 3,944,723 | 3/1976 | Fong . |
| 3,944,932 | 3/1976 | Fong . |
| 3,952,285 | 4/1976 | Falck, Jr. . |
| 3,967,264 | 6/1976 | Whyte et al. . |
| 3,973,240 | 8/1976 | Fong . |
| 3,980,954 | 9/1976 | Whyte . |
| 4,040,046 | 8/1977 | Long et al. . |
| 4,085,287 | 4/1978 | Kullman et al. . |
| 4,101,834 | 7/1978 | Stutt et al. . |
| 4,107,656 | 8/1978 | Farnsworth et al. . |
| 4,109,204 | 8/1978 | Kincaid et al. . |
| 4,130,874 | 12/1978 | Pai . |
| 4,131,881 | 12/1978 | Robinson . |
| 4,135,101 | 1/1979 | Young et al. . |
| 4,135,181 | 1/1979 | Bogacki et al. . |
| 4,161,720 | 7/1979 | Bogacki . |
| 4,178,482 | 12/1979 | Ouellette . |
| 4,188,619 | 2/1980 | Perkins . |
| 4,190,800 | 2/1980 | Kelly, Jr. et al. . |
| 4,199,761 | 4/1980 | Whyte et al. . |
| 4,204,194 | 5/1980 | Bogacki . |

(List continued on next page.)

FOREIGN PATENT DOCUMENTS

| | | |
|---|---|---|
| 1140251 | 2/1965 | United Kingdom . |
| 1121719 | 8/1966 | United Kingdom . |
| 1172344 | 11/1969 | United Kingdom . |
| 1400477 | 7/1975 | United Kingdom . |
| 629098 | 12/1994 | United Kingdom .............. 340/870.02 |

*Primary Examiner*—Brian Zimmerman
*Assistant Examiner*—Timothy Edwards, Jr.
*Attorney, Agent, or Firm*—Paul & Paul

[57] ABSTRACT

A communication system transmits data between a plurality of locations. The communication system is suitable for use by a utility provider to monitor a plurality of metering devices from a remote location. The communication system in accordance with use by a utility provider to monitor metering devices comprises a control for at least receiving data, a plurality of metering devices arranged in a defined number of metering groups for transmitting data associated with an amount of usage of a utility, and a defined number of concentrators, each operably connected to the control and one metering group for transmission of data between the control and plurality of metering devices.

31 Claims, 3 Drawing Sheets

U.S. PATENT DOCUMENTS

| | | |
|---|---|---|
| 4,204,195 | 5/1980 | Bogacki . |
| 4,250,489 | 2/1981 | Dudash et al. . |
| 4,254,402 | 3/1981 | Perkins . |
| 4,264,960 | 4/1981 | Gurr . |
| 4,270,206 | 5/1981 | Hughes . |
| 4,276,644 | 6/1981 | DeWitte . |
| 4,298,986 | 11/1981 | Hughes . |
| 4,300,126 | 11/1981 | Gajjar . |
| 4,301,445 | 11/1981 | Robinson . |
| 4,302,750 | 11/1981 | Wadhwani et al. . |
| 4,307,464 | 12/1981 | Hughes . |
| 4,308,619 | 12/1981 | Hughes . |
| 4,310,805 | 1/1982 | Hackert et al. . |
| 4,315,251 | 2/1982 | Robinson et al. . |
| 4,322,842 | 3/1982 | Martinez . |
| 4,323,882 | 4/1982 | Gajjar . |
| 4,344,180 | 8/1982 | Cummiskey . |
| 4,349,879 | 9/1982 | Peddie et al. . |
| 4,361,766 | 11/1982 | deMontgolfier et al. . |
| 4,375,100 | 2/1983 | Tsuji et al. . |
| 4,393,501 | 7/1983 | Kellogg et al. . |
| 4,396,915 | 8/1983 | Farnsworth et al. . |
| 4,400,811 | 8/1983 | Brown et al. . |
| 4,427,968 | 1/1984 | York . |
| 4,429,299 | 1/1984 | Kabat et al. . |
| 4,446,462 | 5/1984 | Ouellette et al. . |
| 4,455,655 | 6/1984 | Galen et al. . |
| 4,462,109 | 7/1984 | Hughes . |
| 4,475,217 | 10/1984 | Hughes . |
| 4,504,831 | 3/1985 | Jahr et al. . |
| 4,513,415 | 4/1985 | Martinez . |
| 4,517,562 | 5/1985 | Martinez . |
| 4,518,822 | 5/1985 | Martinez . |
| 4,584,685 | 4/1986 | Gajjar . |
| 4,599,598 | 7/1986 | Komonda et al. ................. 340/310.01 |
| 4,628,313 | 12/1986 | Gombrich et al. . |
| 4,641,322 | 2/1987 | Hasegawa . |
| 4,641,325 | 2/1987 | Hughes . |
| 4,749,992 | 6/1996 | Fitzemeyer et al. . |
| 4,833,618 | 5/1989 | Verma et al. . |
| 4,862,493 | 8/1989 | Venkatarman et al. . |
| 4,881,070 | 11/1989 | Burrowes et al. . |
| 4,937,569 | 6/1990 | Trasl et al. ......................... 340/310.01 |
| 5,268,666 | 12/1993 | Michel et al. . |
| 5,406,249 | 4/1995 | Pettus ................................. 340/310.06 |
| 5,452,291 | 9/1995 | Eisenhandler et al. . |
| 5,495,239 | 2/1996 | Ouellette . |
| 5,590,179 | 12/1996 | Shincovich et al. . |
| 5,602,744 | 2/1997 | Meek et al. . |
| 5,699,276 | 12/1997 | Roos . |
| 5,748,104 | 5/1998 | Argyroudis et al. ............... 340/870.02 |

SYSTEM AND METHOD FOR COMMUNICATION BETWEEN REMOTE LOCATIONS

BACKGROUND OF THE INVENTION

1. Field of the Invention

The present invention relates generally to utility monitoring systems and more particularly to systems for communicating between remote locations.

2. Description of the Prior Art

Metering devices have for years been used in the monitoring of utility consumption, such as water, electricity, gas, to name a few. Utility providers have typically utilized metering devices at the various locations of its customers, i.e., residences or businesses, in order to monitor the consumption of a given utility. The utility provider would monitor the utility consumption by reading the various metering devices at each of the customer locations. In recent years, it has been recognized that the costs incurred by the utility provider have significantly increased in view of the numerous employees required to manually read each of the metering devices at the customer locations; especially in view of the higher number of customers of many current day utility providers.

In view of the foregoing, there is seen a need to provide a system for monitoring of metering devices from remote locations in order to reduce both the time and costs associated with manual reading of metering devices.

SUMMARY OF THE INVENTION

The present invention discloses a system and method for a utility provider to monitor a plurality of metering devices from a remote location. For this purpose, the present invention discloses control means for at least receiving data, a plurality of metering devices arranged in a defined number of metering groups and a defined number of concentrators, with each concentrator comprising relay means for communication between one metering group and the control means.

The present invention also discloses a relay for communication between a plurality of metering devices and at least one control station. As will be described in more detail herein, the relay in one embodiment comprises LAN means for receiving data from the plurality of metering devices over a local area network and WAN means for transmitting data associating with the plurality of metering devices over a wide area network to the at least one control station.

The present invention also discloses a communication system for transmitting data between a plurality of locations. In this regard, the present invention comprises control means for receiving and transmitting data, relay means in communication with the control means and a plurality of servicing means in communication with the relay means for transmitting data to and receiving data from the control means.

In accordance with the present invention, an object is to provide a system and method for a utility provider to monitor metering devices from remote locations.

Another object of the present invention is to provide a system and method for monitoring metering devices from remote locations which is efficient in operation so that minimal parts are required and which can be provided at minimal cost.

Still another object of the present invention is to provide a communication system for transmitting data between a plurality of locations.

Another object of the present invention is to provide a novel concentrator for use in data transmission between a plurality of locations to provide for improved data transmission.

These and other objects of the present invention will become more readily apparent when taken into consideration with the following description and the attached drawings.

DETAILED DESCRIPTION OF THE PREFERRED EMBODIMENTS

Figure 1:
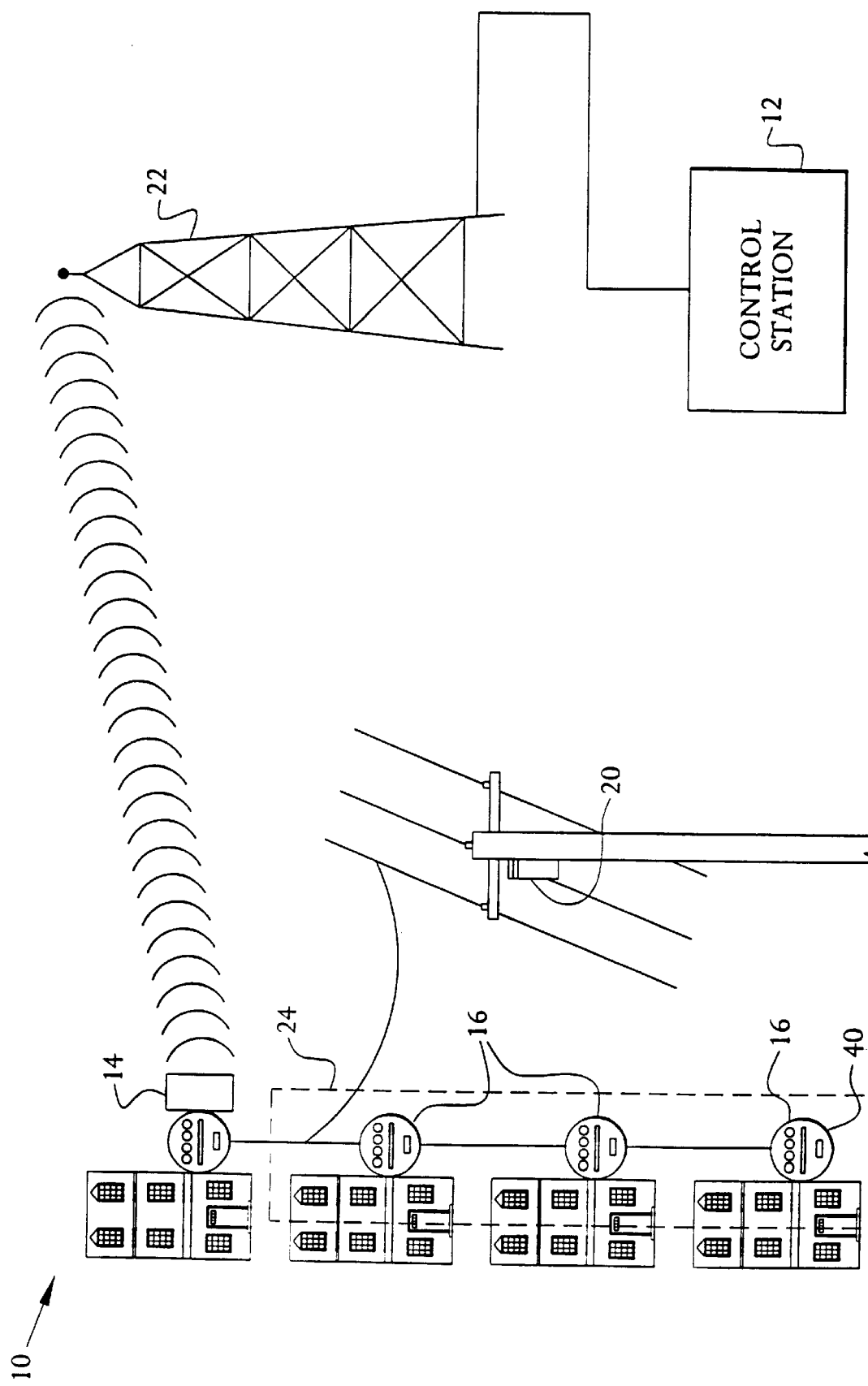
FIG. 1 is a partly schematic and partly block diagram of an embodiment of a communication system in accordance with the present invention.

Referring now to the drawings in detail, wherein like reference numerals indicate the like elements throughout the several views, there is shown in FIG. 1 a partly schematic and partly block diagram of a communication system in accordance with an embodiment of the present invention. The communication system 10 as is shown in FIG. 1 comprises, as portions thereof, control means 12, a defined number of relay means 14 in communication with the control means 12 and at least one and preferably a plurality of servicing means 16 in communication with the relay means 14, the details of which will be more fully set forth hereinafter.

In accordance with the present embodiment, the communication system 10 is adapted for use by a utility provider for customer communication. As should be understood, however, the communication system 10 in accordance with the present invention has broader application and can be used for any desired application. The control means or station 12 preferably is located at a desired location and is capable for transmitting and receiving data in the form of signals, for example, a computer, microprocessor or similar device, i.e., a Pentium® based PC can be employed. In the present embodiment, the control means 12 is located at the site of the utility provider, although any other desired location can also be utilized for this purpose. Although not shown, the control means 12 can be provided in communication with other devices as well, such as one or more personal computers or computer terminals, for example, for display, for data input or processing or other desired functions. In accordance with the present invention, the data signals transmitted over the communication system 10 between the control means 12, relay means 14 and servicing means 16 can be carried by any desired medium, such as either by any wireless medium, such as radio frequency (RF) or infrared (IR) signals, or can be carried over any wire medium, such as 110 volt AC power line (PLC), twisted pair (TP) cable, fiber optic cable and coax cable. In the present embodiment, the data signals transmitted between the control means 12 and the relay means 14 preferably are carried over both wire and wireless mediums, which is described in more detail below.

As illustrated in FIG. 1, the control means 12 is in communication by a wire medium with switching means comprising at least one radio tower 22, which in turn is in communication with the relay means 14 via a suitable wireless medium. In a preferred embodiment, the control means 12 and relay means 14 are in communication with the radio tower 22 via a publicly available Wide Area Network (WAN), for example, such as Sprint PCS, AT&T Wireless, and Bell Atlantic Mobile. In this manner, the signals received by the WAN provider over wire signals from the control means 12 are transmitted as suitable wireless signals, preferably RF signals, from the radio tower 22 to the relay means 14. Similarly, in the presently preferred embodiment, the wireless signals received by the WAN provider from the relay means 14 are transmitted over wire to the control means 12.

The relay means 14 in the present embodiment shown in FIG. 1 is preferably in communication over a suitable wire medium with the servicing means 16, although as should be understood a suitable wireless medium can also be used. In accordance with the present invention, there are a defined number of relay means 14, with each relay means 14 being in communication with a selected number of servicing means 16 comprising a servicing group 24. As illustrated in FIG. 1, in the present embodiment, there is shown the servicing group 24 comprising three servicing means 16 in communication with the one relay means 14. In a presently preferred embodiment, the servicing group 24 is in communication with the relay means 14 via a Local Area Network (LAN). More preferably, communication between the servicing group 24 and the relay means 14 is accomplished using a Consumer Electronics Bus (CEBus) standard, which is described in more detail below, although as should be understood, other suitable protocols can also be used for this purpose. Also, preferably communication between the relay means 14 and the control means 12 is accomplished using a suitable WAN protocol.

The CEBus standard is a home automation standard developed by the Electronics Industry Association and the Consumer Electronics Manufacturers Association to provide economical LAN communications among consumer products within the home. The CEBus standard is explained in greater detail in Electronics Industries Association/IS-60, "Home Automation Standard" (CEBus) December 1989, which is incorporated herein by reference. The CEBus protocol was designed to cover communications between various types of products over any of a number of accepted media that support CEBus, which includes PLC, TP cable, coaxial cable, IR, RF and fiber optic cable.

Figure 3:
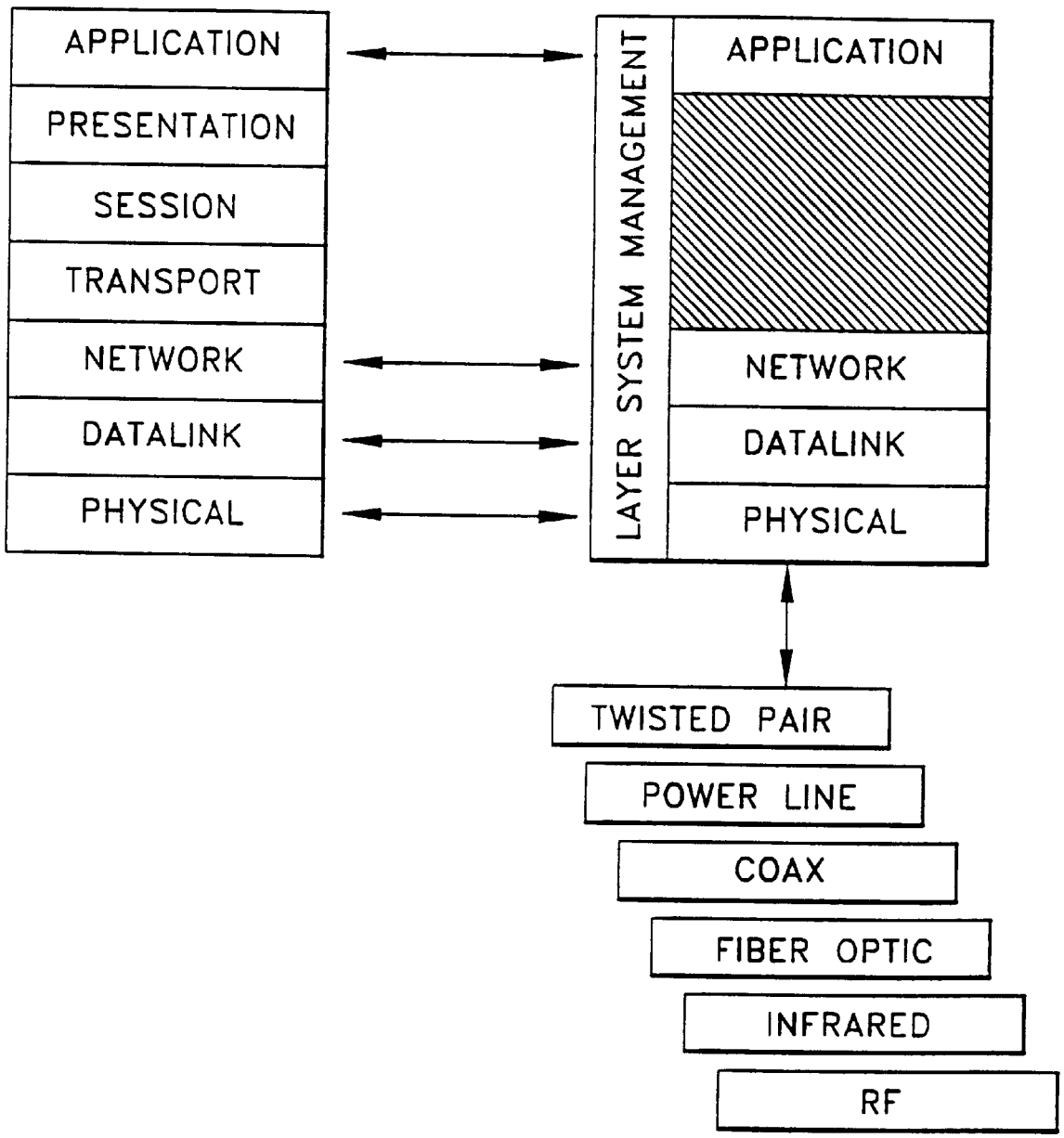
FIG. 3 is a block diagram illustrating protocol layering associated with a Consumer Electronics Bus Standard.

As illustrated in FIG. 3, the CEBus standard is a four layer model based on the International Standards Organization's (ISO) Open Systems Interconnection seven layer model for communication. The four layers utilized in the CEBus protocol include application, network, data link and physical layers, which are defined in the following paragraph.

The physical layer is the form of signal and provides the characteristics to activate, maintain and deactivate the physical links passing the stream of communication symbols. The physical layer exchanges symbols with the data link layer, encoding and decoding the symbols to and from the medium states. The states required to represent the symbols are modulated and demodulated with the medium carrier by the physical layer. The data link layer provides the means for establishing and maintaining individual data links, provides for the transfer of information over the physical link with the required synchronization, error control and flow control functions, provides for the encapsulation and de-encapsulation of the messages exchanged between itself and the network layer, and exchanges symbols and medium status between itself and the physical layer. The network layer sets basic standards for formatting of information once the link is established and provides the switching and routing functions needed to establish, maintain and terminate connections and data transfer. The application layer specifies how service is received or experienced and is responsible for managing the communication access.

In accordance with the present invention, preferably each of the servicing means 16 comprises means for transmitting and receiving data for communication with the control means 12 via the relay means 14; for example, conventional transmitter and receiver units can be utilized for this purpose. In a presently preferred embodiment illustrated in FIG. 1, each of the servicing means 16 comprises a metering device and located at the site of the customer of the utility provider, i.e., residencies or businesses. For example, each of the metering devices 16 can comprise a typical rotary, electro-mechanical or electronic type utility meter, although other suitable types of metering devices would also be applicable. In addition, each metering device 16 preferably includes means for measuring an amount of usage of a utility, such as electricity, gas or water, as examples, for the specific location to which the metering device 16 is connected. In the regard, the metering devices 16 preferably are of the incremental type similar to typical metering devices. In addition, the metering devices 16 also preferably include means for processing and storing of the data associated with the measured amount of utility usage, for example, a microprocessor with suitable storage means, such as random access memory (RAM) and read only memory (ROM). As should be understood, in other embodiments where the servicing means 16 are not in the form of metering devices, the foregoing features associated with monitoring of a given utility would not be required.

In accordance with the present embodiment, the metering devices 16 are each connected via power lines to the relay means 14, either by a direct connection between each metering device 16 to the relay means 14 or, as shown in FIG. 1, with each of the metering devices 16 being connected via power lines in a series and one of the metering devices 16 then being connected to the relay means 14. In other embodiments, the metering devices 16 can be connected by other wire mediums and/or wireless mediums to the relay means 14 as well, for example, a wireless medium may be suited where the metering devices are used for measuring gas, in view of typical gas metering devices which do not require connection to a power source, whereas a wire medium may be more suited for embodiments in which the metering devices are for measuring electricity, as most typical metering devices used for measuring electricity usage are connected to a 240 volt power outlet, thus easily adapted for power line communication. As should be understood, the foregoing examples are for illustration purposes only and are not intended to limit the scope of the present invention. In the present embodiment, preferably the communication system 10 also includes at least one and typically a plurality of distribution transformers 20, positioned between one or more metering devices 16 and the relay means 14, for scaling downward to 220 volts the typically higher voltages generated over the power lines. In this manner, a LAN is established between each of the metering devices 16 and the relay means 14.

Figure 2:
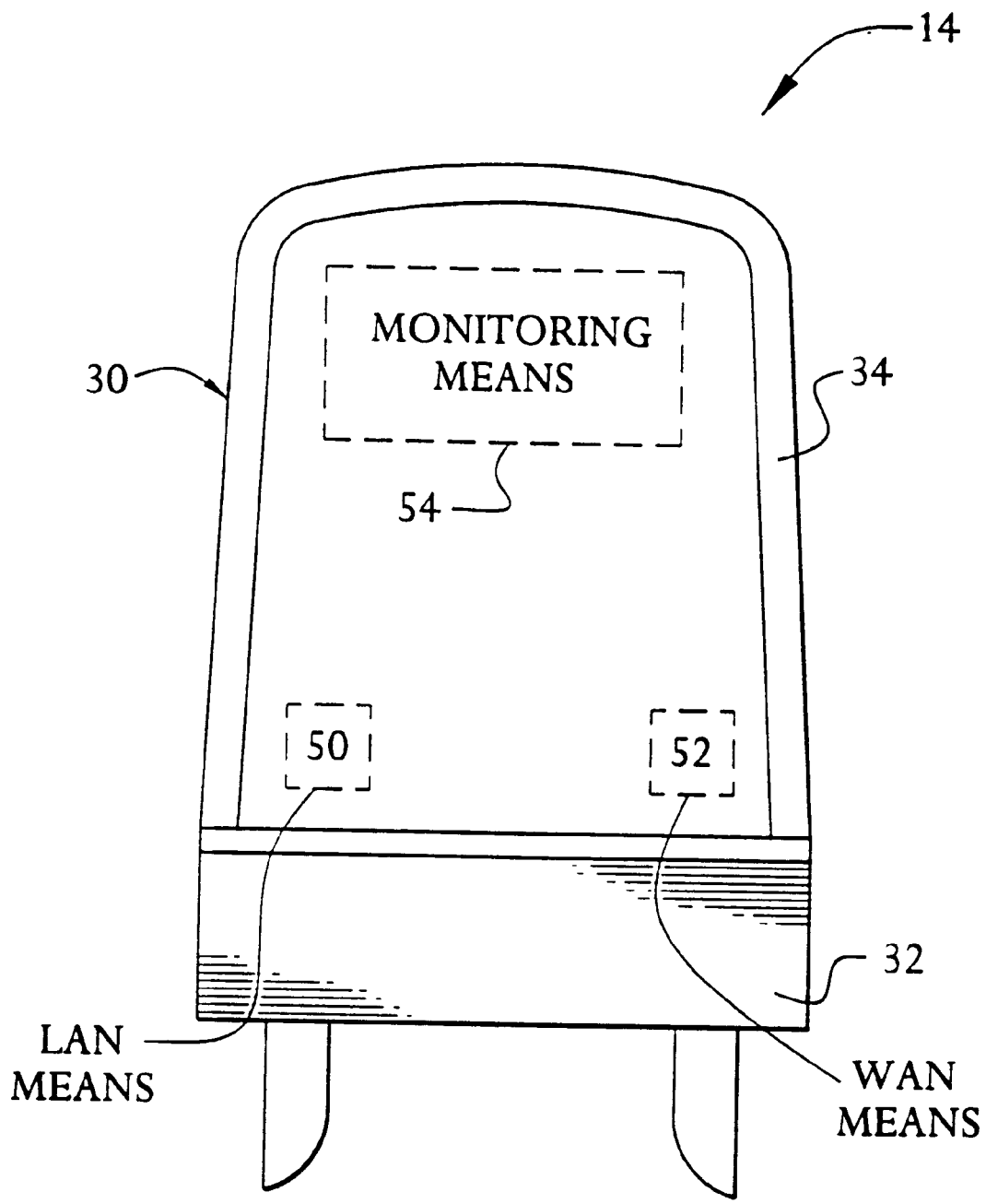
FIG. 2 is a partly schematic and partly block diagram of an embodiment of a concentrator of FIG. 1.

In accordance with the present invention, the relay means 14 can be positioned at any desired location within the communication system 10; for example, the relay means 14 can be located on a distribution pole or other location. In the present embodiment, preferably the relay means 14 comprises a concentrator in the form of a meter and positioned at the location of a customer. The concentrator meter 14 in accordance with an embodiment of the present invention is illustrated in detail in the block diagram of FIG. 2. The concentrator meter 14 preferably includes LAN means 50 for receiving and transmitting data over the local area network, such as a conventional transmitter and receiver. In addition, in the present embodiment, the concentrator meter 14 also preferably includes WAN means 52 for communicating (receiving and transmitting) data over the wide area network with the control means 12 via the switching means 22, such as a conventional WAN radio; for example, the Code Division Multiple Access type, commercially available from Qualcomm, the Time Division Multiple Access type, commercially available from Ericsson, and the Cellular Digital Packet Data type, commercially available from Sierra Wireless and Novatel. In addition, similar to the metering devices 16, preferably the concentrator meter 14 includes monitoring means 54 for measuring an amount of usage of a utility at a given location, similar to conventional incremental type metering devices including those of the rotary, electro-mechanical and electronic types. The concentrator meter 14 in the present embodiment also preferably includes means for processing and storing data associated with both the amount of utility usage measured by the concentrator meter 16 as well as received from the metering devices 16, for example, a conventional microprocessor and storage means, such as suitable amounts of RAM and ROM. In the present embodiment, the concentrator meter 14 further preferably includes means for exchanging between two media, for example between radio frequency signals and signals transmitted over the power lines in the present embodiment, such as a conventional router device. The concentrator meter 14 can also include a battery for providing a backup power source. In the present preferred embodiment, the concentrator meter 14 preferably also includes a housing into which each of the foregoing elements are disposed and retained as a unit. For example, as shown in FIG. 3, the housing 30 is generally elongated and substantially cylindrical in cross section having an inner cavity into which the components of the concentrator meter 14 are mounted, such as the LAN means 50, WAN means 52 and monitoring means 54 as illustrated. In the present embodiment, the housing 30 comprises a base 32 to which the elements of the concentrator meter are attached and a cover 34, preferably clear, such as of glass or plastic, and having a cavity receiving the elements of the concentrator meter 14 and attached to the base 32, although as should be understood, the housing 30 can be of other configurations as well. Similar to the servicing means 16 described above, the relay means 14 in other embodiments may be utilized for communication between the control means 12 and servicing means 16 without also providing the function of a meter, and accordingly the foregoing elements directed to providing the function of the meter can be eliminated where desired.

The operation of the communication system 10 in accordance with the present embodiment will now be described. As described earlier, one advantage of the communication system 10 in accordance with the present embodiment is that the utility provider can monitor the utility usage of a customer from a remote location. For this purpose, a command can be generated automatically from the control means 12, such as by a software program, or manually from a technician or other personnel to instruct a given metering device at a particular customer location to transmit the measured amount of utility usage. Alternately, the metering devices 16 can be preprogrammed to automatically transmit the utility usage data to the control means 12 at specified intervals. For purposes of this illustration, a signal is initially generated by the control means 12 to a particular metering device 16. In accordance with the CEBus protocol, the signal generated from the control means 12 is preferably generated in packets of data in digital form and incorporates within the packet an identifier, such as a number, associated with the particular metering device or devices which monitoring is desired. The data signal is transmitted from the control means 12 over the wire medium, such as telephone lines, which are received by the WAN provider for re-transmission to the concentrator meter 14. The WAN provider exchanges the data from the wire to wireless medium, such as by a router, and then transmits the data as radio frequency signals to the concentrator meter 14. The concentrator meter 14, in turn, exchanges the data received over the wide area network for transmission via power line communication over the local area network to the metering devices 16. In the present embodiment, the concentrator meter 14 can be pre-programmed so as to transmit a data signal only to a particular metering device or devices 16 depending on the particular meter identified in the packet of data. Alternatively, the concentrator meter 14 can be programmed to transmit the data signals to each of the metering devices 16, with the metering devices 16 in turn programmed to respond only when its particular meter identifier is detected. For purposes of this illustration, it will be assumed that the concentrator meter 14 is constructed so as to transmit data to each of the metering devices 16, with the data generated from the control means 12 including an identifier for a particular metering device 16 designated as number "1" to monitor utility usage. Further, preferably the control means 12 correlates the metering device 16 designated as number "1" with the appropriate concentrator meter 14. In this example, the meter device 16 designated as number "1" is illustrated in FIG. 1 by the metering device 40. The metering device 40 receives the data signal from the concentrator meter 14 and in response transmits data in signal form incorporating a reading of the amount of utility usage measured at the particular customer location. In a similar manner to that described above, the signal from the metering device 40 is passed through the concentrator meter 14 and is received via the WAN provider by the control means 12. In this manner, a read of the metering devices 16 at each of the customer locations can be obtained by the utility provider.

Another advantage of the present invention is its application for transmission of data between a plurality of locations. For example, in the communication system 10 described above, communication is established between the utility provider, via the control means 12, and the customers of the utility provider, via the servicing means 16 which are in the form of metering devices, for monitoring the amount of usage of a given utility. As should be understood, the communication system of the present invention is not limited to use by a utility provider to monitor utility usage of its customers, rather the communication system of the present invention is applicable for any communication between two locations. For example, in connection with use by a utility provider, the control system 10 described above can also be adapted so that the utility provider can communicate with one or more customers, via the metering devices 16, to perform, in addition to automatic meter reads on any desired basis, other functions as well, such as outage/restoral monitoring, customer consumption readings on request, Time-Of-Use (TOU) reporting to customers, billing capability, tamper detections/deterrence and deferment of peak use through TOU rate information. In addition, through in-home user-interfaces, such as in-home terminals, smart phones, smart thermostats, etc., a utility provider in addition to reading of meters, or other entities that do not incorporate the feature of meter reading within the servicing means 16, can communicate with customers for Real Time Pricing (RTP), remote service connect/disconnect, messaging services, such as headline/local news, financial quotes, energy information, etc., and home monitoring, such as break-in and personal security, appliances, etc.

Still another advantage of the present invention is provided by the relay means 14 for communication between the control means 12 and servicing means 16, which provides for efficient operation in that only one relay means 14 is required for a plurality of servicing means 16. In addition, the relay means 14 when in the form of the concentrator meter 14 provides for even greater efficiency since the features of a meter and relay means between the metering devices 16 and control means 12 are combined into a single unit and which can be provided directly at a customer location.

It will be recognized by those skilled in the art that changes may be made by the above-described embodiments of the invention without departing from the broad inventive concepts thereof. It is understood, therefore, that this invention is not limited to the particular embodiments disclosed, but it is intended to cover all modifications which are within the scope and spirit of the invention as defined by the appended claims.

I claim:

1. A system for a utility provider to monitor a plurality of metering devices from a remote location comprising:

control means for at least receiving data;

a plurality of metering devices, with each said plurality of metering devices comprising means for transmitting data associated with an amount of usage of a utility, wherein said plurality of metering devices are arranged in a defined number of metering groups, with each said metering group comprising a selected number of plurality of metering devices operably connected together; and a defined number of concentrator, with each said concentrator being operably connected to the control means and one meter group, with each said concentrator being operably connected to one metering group by at least one power line, wherein each said concentrator comprises relay means for receiving data from one metering group over said at least one power line and transmitting data corresponding to the data received from said one metering group for receipt by said control means, to identify the amount of usage of a utility associated with each of the plurality of metering devices wherein said concentrator further comprises a metering device and includes means for monitoring an amount of usage of a utility.

2. A system according to claim 1, wherein said control means further comprises means for transmitting data associated with a desired function of said plurality of metering devices, wherein each said plurality of metering devices further comprises means for receiving data associated with the desired function, and wherein said relay means further comprises both means for receiving data from said control means associated with the desired function of said plurality of metering devices and means for transmitting data corresponding to said data received from said control means to said one metering group.

3. A system according to any one of claims 1 and 2, wherein said relay means comprises LAN means for receiving data from said one metering group over a local area network and WAN means for transmitting data for receipt by said control means over a wide area network.

4. A system according to claim 3, wherein said WAN means comprises means for transmitting said data as radio frequency signals.

5. A system according to claim 4, further comprising switching means in communication with and transmitting data between said concentrator and said control means.

6. A method for a utility provider to monitor a plurality of metering devices comprising the steps of:

providing a control means for transmitting and receiving data at a desired location;

providing a plurality of metering devices at locations remote from said desired location of said control means, with each said plurality of metering devices comprising means for receiving and transmitting data;

providing a defined number of concentrator, with each said concentrator being operably connected to the control means and one meter group comprising, a selected number of said plurality of metering devices defining said metering group being operably connected together by at least one wire and data is transmitted between said selected number of said plurality of metering devices of said metering group over said at least one wire, wherein each said concentrator comprises communication means comprising means for receiving data from said control means and transmitting data corresponding to said data received from said control means to said metering group and means for receiving data from said metering group and transmitting data corresponding to said data received from said metering group to said control means;

transmitting data from said control means for receipt by a predetermined concentrator for instructing at least one metering device to identify a usage amount of a utility;

transmitting said data from said predetermined concentrator corresponding to said data transmitting from said control for receipt by said at least one metering device within a predetermined metering group;

transmitting data from said predetermined concentrator corresponding to said data transmitted from said at least one metering device for receipt by said control means;

wherein said concentrator further comprises a metering device and includes means for monitoring an amount of usage of a utility.

7. A method according to claim 6, wherein the step of providing a defined number of concentrators further comprises the step of providing each said defined number of concentrators as a metering device further comprising means for monitoring an amount of usage of a utility and a housing for receiving said monitoring means and said communication means.

8. A method according to any one of claims 6 and 7, wherein said steps of transmitting data from said predetermined concentrator for receipt by said at least one metering device and transmitting data from said at least one metering device for receipt by said predetermined concentrator further comprises the step of transmitting data over a local area network.

9. A method according to claim 8, wherein said step of transmitting data over a local area network comprises the step of transmitting data over at least one wire.

10. A method according to claim 9, wherein said step of transmitting data over at least one wire comprises the step of transmitting data over at least one power line.

11. A method according to claim 9, wherein said steps of transmitting data from said control means for receipt by said predetermined concentrator and transmitting data from said predetermined concentrator for receipt by said control means comprises the step of transmitting data over a wide area network.

12. A method according to claim 11, wherein the step of transmitting data over a wide area network comprises the step of transmitting data as wireless signals.

13. A method according to claim 12, wherein the step of transmitting data as wireless signals comprises the step of transmitting radio frequency signals.

14. A method according to claim 12, wherein the step of transmitting data over a wide area network further comprises the steps of transmitting data as signals over a wire medium and exchanging data between signals transmitted over a wire medium and signals transmitted over a wireless medium.

15. A method according to claim 14, wherein the step of transmitting data further comprises the step of transmitting data formatted according to a Consumer Electronics Bus protocol.

16. A concentrator having means for relaying communication between a plurality of metering devices and at least one control station comprising;

concentrator comprising a meter and means for monitoring an amount of usage of a medium;

LAN means for receiving data from said plurality of metering devices over a local area network;

WAN means for transmitting data associated with both said plurality of metering devices and said monitoring means over a wide area network to said at least one control station; and a housing comprising a meter receiving said monitoring means, said LAN means and said WAN means.

17. A relay according to claim 16, wherein the WAN means further comprises means for receiving data from said at least one control station over said wide area network and said LAN means further comprises means for transmitting data over said local area network to each of said plurality of metering devices.

18. A relay according to any one of claims 16 and 17, wherein said LAN means further comprises means for receiving and transmitting data over a wire operably connected via at least one power line to said plurality of metering devices.

19. A relay according to claim 18, wherein said WAN means further comprises means for receiving and transmitting radio frequency signals.

20. A relay according to claim 16, wherein said housing defines an inner surface into which said monitoring means, said LAN means and said WAN means are mounted and retained, and wherein said medium comprises a utility.

21. A relay according to claim 20 further comprising means for processing and storing data associated with both said monitoring means and said plurality of metering devices, and with said processing means being mounted in said housing.

22. A relay according to claim 21 further comprising means for exchanging data transmitted between said local area network and said wide area network.

23. A communication system for transmitting data between a plurality of locations comprising;

control means for receiving and transmitting data;

a concentrator comprising, a meter and means for monitoring an amount of usage of a medium, having a relay means in communication with said control means; and a plurality of servicing means, comprising at least one meter, in communication with said relay means for transmitting data to and receiving data from said control means via said relay.

24. A communication system according to claim 23 wherein the data communication between the concentrator and the service means is formatted according to a Consumer Electronic Bus protocol.

25. A communication system according to claim 23, wherein said servicing means is in communication with said relay means over a local area network.

26. A communication system according to claim 25, wherein said servicing means and said relay means are operably connected via at least one power line.

27. A communication system according to claim 25, wherein said relay means is in communication with said control means over a wide area network.

28. A control system according to claim 27, wherein said relay means communicates with said control means over said wide area network by radio frequency signals.

29. A communication system according to claim 28, wherein said servicing means comprises a meter, said meter comprising means for monitoring and means for transmitting data corresponding to said monitoring means via said local area network to said relay means.

30. A communication system according to claim 29, wherein said relay means comprises a meter, said meter comprising means for monitoring, means for receiving said data from said servicing means over said local area network, and means for transmitting data corresponding to said monitoring means and said data received from said servicing means to said control means.

31. A communication system according to claim 30 further comprising switching means in communication with and transmitting data between said relay means and said control means.

* * * * *